April 15, 1924.

F. W. TABER 1,490,143

METHOD AND APPARATUS FOR CEMENTING OIL WELLS

Filed Feb. 13, 1922

Witness:
R. Burkhardt.

Inventor:
Fairman Wallace Taber,
By Wilkinson Huxley Byron & Knight
attys.

Patented Apr. 15, 1924.

1,490,143

UNITED STATES PATENT OFFICE.

FAIRMAN WALLACE TABER, OF DUNCAN, OKLAHOMA.

METHOD AND APPARATUS FOR CEMENTING OIL WELLS.

Application filed February 13, 1922. Serial No. 536,287.

*To all whom it may concern:*

Be it known that I, FAIRMAN WALLACE TABER, a citizen of the United States, residing at Duncan, in the county of Stephens and State of Oklahoma, have invented certain new and useful Improvements in Method and Apparatus for Cementing Oil Wells, of which the following is a specification.

This invention relates to a new and improved method and means for cementing oil wells and more particularly to a method and means in the use of which it is possible to accurately determine the height of cement remaining in the well.

As is well known in the art, in drilling an oil well, a metal casing is inserted in the well hole, there being a small clearance between the casing and the hole. It frequently happens that the well passes through water bearing strata before reaching the oil bearing sands. Water will pass down the well around the casing to the sand and in pumping the oil, it will be necessary to pump a considerable amount of water therewith. This condition is further objectionable in that the water coming down the well has a tendency to obstruct the oil bearing sands and to displace and drive away the oil. Such conditions often render the well commercially useless.

In order to remedy such conditions, various methods have heretofore been devised for placing cement around the well casing at its lower end for a sufficient depth to prevent passage of the water. Since it is necessary to place this cement at the bottom of the well which may be several thousand feet deep, it has been found extremely difficult to accurately determine the location of the cement.

Of the various methods heretofore in use, one has consisted in forcing down an amount of cement with a plug below and a plug above, it being expected that the first plug will go beyond the end of the casing and that the second plug will then force the cement up outside the casing and will engage the first plug when this is accomplished. The difficulty with such methods lies in the fact that it is substantially impossible to determine when the plugs meet. It cannot definitely be known that they have met when circulation is stopped since other conditions might obstruct the passage of the plugs. Any attempt to determine the location of a plug which has been forced down the casing by measuring the amount of material pumped in above the plug is at best only a wide approximation. This is for the reason that due to variations in the size of casings and of the couplings used to join casing sections, any estimate of the volume of the casing is liable to considerable error.

Attempts have been made to measure the distance traveled by a plug by following the plug down with a weight to which is attached a measuring line. This is more accurate than an estimate made from the volume of the casing contents but is still subject to error since it is difficult to prevent slack in the line, causing kinking, and also since lines are subject to considerable stretch in a length of 2000 feet or more when a weight is hung upon them. This stretch is subject to considerable variation and cannot be measured with very great accuracy.

The location of the top of the cement can be determined with very great accuracy if it be measured not from the top of the well but from the bottom since it is customary to leave only a relatively few feet of cement in the casing. Some cement is left in the casing since, due to the settling of the cement materials during their passage down the well, the upper portion of the cement is of relatively small strength and would not be efficient in sealing the casing. This cement is later drilled out after the cement has set. In some cases, it will be found that the upper portion of the cement has become so contaminated that it will not set and it can be bailed out.

It is an object of the present invention to provide a method and means for cementing oil wells adapted to positively locate the top of the cement at a predetermined point in the well, such point being measured from the bottom of the well.

It is a further object to provide means whereby hydraulic pressure need not be maintained until the cement has set, and where the casing can be kept in motion throughout the process of cementing.

It is also an object to provide means of this character which are simple in design and construction and easy and accurate of operation regardless of whether or not the depth of the well is accurately known.

Other and further objects will appear as the description proceeds.

Broadly, my invention comprises means for forcing material downwardly of the well casing and a second means for positively indicating the arrival of the first-named means at a predetermined depth.

In the preferred form, this depth is measured from the bottom of the well and the measuring means consists in a guide line extending to the bottom of the well and having an indicating element located thereon at the predetermined point above the bottom. In the form shown, a plug, which forces the material down, operates upon the indicating element to disconnect the guide line at that point when the plug reaches the element.

I have illustrated a preferred form of my invention in the accompanying drawings, in which—

Figure 1:
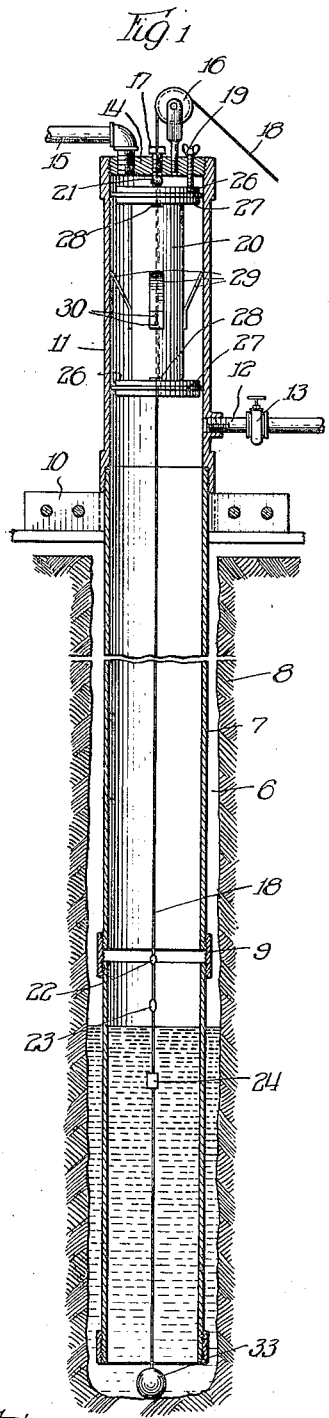
Figure 1 is a longitudinal section of a well with my means applied thereto preparatory to pouring in the cement.
Figure 2:
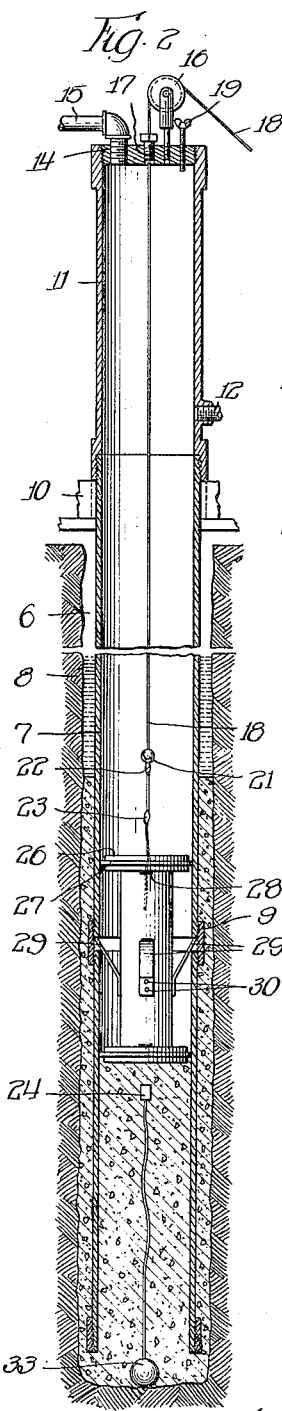
Figure 2 is a view similar to Figure 1 showing the well after the cement has been forced to the proper location.

Referring now to the drawings, the well has the clearance 6 between the casing 7 and the earth 8. The casing comprises a plurality of sections joined by couplings 9. The casing is supported at its upper end by any desired means indicated at 10. The casing head 11 is fitted upon the upper end of the casing, the pipe 12 leading into it adjacent its lower end, the pipe, as shown, being controlled by valve 13. Fitted in the upper end of the casing head 11 is the closure member 14. The pipe 15 opens through the member 14 and the pulley 16 is supported from said member. Centrally of the member 14 is located the nipple 17 through which passes the guide line 18, the upper portion of which passes over the pulley 16. The wing bolt 19 extends through the member 14 and is adapted to have its lower end threaded into the plug 20 which is shown in the casing head in Figure 1. The return weight 21 is shown in Figure 1 resting upon the upper surface of the plug 20 and has an opening through which the guide line 18 passes.

Figure 4:
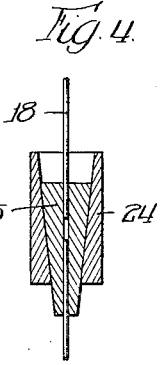
Figure 4 is an enlarged detail section of the signal clamp.

The guide line 18 is provided with the two enlarged portions 22 and 23. This line is divided into two parts which are secured together by the clamp shown in detail in Figure 4. This clamp comprises the outer element 24 and inner element 25. Movement of the inner element 25 downwardly into the outer element serves to positively clamp the two sections of the guide line together. Movement of the outer element 24 downwardly relative to the inner element serves to release the clamping action.

Figure 3:
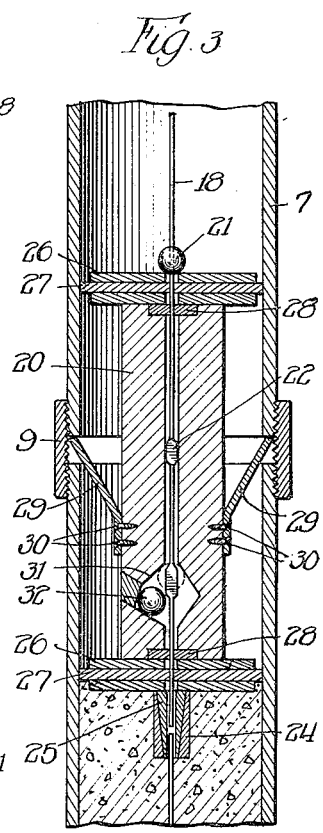
Figure 3 is an enlarged section showing the construction of the plug and of the guide line.

The plug 20 is shown in detail in Figure 3 and comprises a central portion considerably less in area than the cross section of the casing and two end sections 26 which approximate in size and contour the cross section of the casing. Fitted in these end sections are washers 27 of rubber packing or similar material, these washers making a push fit in the casing. The plug has a central aperture extending longitudinally thereof for passage of the guide line. This aperture is of a size sufficient to allow the enlarged portions 22 and 23 to pass through the plug. The washers 27, however, make a close fit with the guide line, their yielding nature permitting the enlarged portions to be drawn through them. As shown in the figure, additional washers 28 are located around the aperture between the plug heads and the body portion of the plug. The plug is provided with a plurality of spring fingers 29 which, as shown, are secured thereto by screws 30. These fingers are adapted to engage the inner surface of the casing, and as clearly shown in Figure 3, they engage the ends of casing sections to prevent return movement of the plug. In order to prevent passage of liquid or semi-liquid material through the central aperture when the guide wires are moved therefrom, the pocket 31 is formed in the plug which pocket contains the ball check valve 32. The lower end of the guide line carries the weight 33. This weight is preferably made of concrete and of a weight of about twenty pounds.

In the use of my apparatus in carrying out my method, the guide line is passed through the nipple 17 in the casing head, through the come-back weight 21 and through the plug 20 and is secured to the lower section by the coupling members 24 and 25. The lower section of the line carries the weight 33. The plug is passed up into the casing head 11, and the wing bolt 19 is screwed into it to retain it in place. The usual head of the casing is removed and the casing head 11 is substituted therefor, the weight 33 and the lower portion of the guide line passing down into the casing.

It is to be understood that the distance between the coupling and the weight 33 or the length of the lower section of the line will have been definitely fixed to correspond to the amount of cement it is desired to leave in the casing. This amount will depend on many conditions such as the nature of the cement used, the condition of the casing, the condition of the hole and the kind of tools to be used in bringing in the well.

The guide line 18 is payed out until the weight 33 comes to rest upon the bottom of the well and is maintained without slack therein. Cement is then pumped into the casing through the pipe 12. The amount will depend upon the size of the hole and casing and upon the distance which is desired to cement and the height of the cement to be left in the casing. The wing bolt 19 is unscrewed to release the plug when sufficient concrete has been pumped into the casing and then fluid is pumped through the pipe 15 above the plug 20 to force the plug down the casing.

It is to be understood that in order to cement a well, circulation must have been secured, that is, material pumped down through the casing must rise to the surface outside the casing. Preferably, the mixture of mud and water forced up outside the casing is used to pump into the casing above the plug. As the enlarged portions 22 and 23 of the guide line pass through the washers in the plug, they afford a signal transmitted through the guide line which signal indicates that the plug has nearly reached the desired point. Pumping continues until the plug engages the clamp member 24 and forces it downwardly relative to the member 25 thus releasing the lower guide line section. This gives a very definite signal and the guide line may now be hauled up. The enlarged portion 22 cannot pass through the opening in the return weight 21 and that weight is carried up with the line and serves to present tangling or kinking of the line.

It is not necessary to maintain the hydraulic pressure in the casing since the plug cannot come upward due to the engagement of the spring fingers 29 with the adjacent casing section end. After the guide line is drawn out, the cement under pressure will come up through the central aperture in the plug and will force the check ball 32 to the dotted line position of Figure 3. The ball will thus prevent passage of the cement upwardly through the plug. It is to be understood that the coupling members and the lower part of the guide line together with the weight 33 remain in the cement and are enclosed thereby. After the cement has set, the plug 20 and the cement below it are drilled out and the well opened down through to the oil bearing sands.

That portion of the cement exterior of the casing has entirely closed off the opening between the casing and the sides of the hole. Circulation is no longer had and water from superposed strata cannot follow down the casing to the oil bearing strata.

A very important feature of my invention lies in the fact that it is entirely unnecessary to know the depth of the well in order to use my method. The only measurement made is that of the depth of cement to remain in the well and this is directly measured by the length of the lower portion of the guide line. In so far as I am aware, none of the prior methods can be safely operated without an accurate knowledge of the depth of the well.

Another important feature of my invention lies in the fact that no changes are made on the casing head after the process of cementing the well is started. This fact permits the casing to be continually kept in motion, by moving it up and down. This movement is absolutely necessary in some oil fields where the earth formations hold the casing tight after it has once been stopped. This prevents circulation, and in some fields, the wells cannot be cemented for this reason and salt water soon ruins them. With my method of cementing all danger of this sticking is eliminated since the casing can be continuously kept in motion.

It is to be understood that the relative sizes of the parts and distances along the depth of the well as shown in the drawings are diagrammatic only. Various modifications will be made to accommodate my method and apparatus to differing conditions and it is my intention to cover all modifications coming within the scope of the appended claims.

I claim:

1. Apparatus for cementing oil wells comprising a weighted guide line, and a plug having a longitudinal aperture therethrough adapted to receive the guide line, the guide line being provided with portions adapted to indicate contact by the plug therewith.

2. Apparatus for cementing oil wells comprising a weighted guide line, and a plug having a longitudinal aperture therethrough adapted to receive the guide line, the aperture having yielding reduced portions and the guide line having enlarged portions adapted to engage the yielding reduced portions of the plug aperture.

3. Apparatus for cementing oil wells comprising means for forcing material downwardly of the well casing and a guide line adapted to be disconnected by said means when the means reaches a predetermined depth.

4. Apparatus for cementing oil wells comprising a plug adapted to force material down the well casing, the plug being provided with spring members adapted to engage the ends of casing sections to prevent return movement of the plug in the casing.

5. Apparatus for cementing oil wells comprising a guide line and a plug associated therewith, the line comprising two meeting portions, and means detachably connecting said portions, said means being operable by the plug to disconnect said portions.

6. Apparatus for cementing oil wells comprising a guide line and a plug associated therewith, the line comprising two meeting portions, and a friction clamp detachably connecting said portions, said clamp being so constructed that a thrust by said plug serves to release the clamping action.

7. Apparatus for cementing oil wells comprising a guide line and a plug associated therewith, the line comprising two meeting portions, and a clamp detachably connecting said portions, said clamp comprising an operating element and an inner element, the operating element extending beyond the inner element along the line in one direction and having a relatively small surface in said direction, the inner element having a relatively large surface in said direction thrust upon the said surface of the operating element serving to disconnect the clamp and thrust upon the said surface of the inner element serving to connect the clamp.

8. The method of cementing oil wells comprising forcing a body of cement down the casing by means of hydraulic pressure acting upon a movable plug, stopping said plug at a predetermined point in the casing, and removing the hydraulic pressure.

9. The method of cementing oil wells comprising passing a jointed guide line down the well until the lower end thereof reaches the bottom and forcing a body of cement down the well by means of a movable plug until the plug reaches the joint in the line.

10. The method of cementing oil wells comprising passing a jointed guide line down the well until the lower end thereof reaches the bottom and forcing a body of cement down the well by means of a movable plug until the plug reaches the joint in the line, disconnecting the line at the joint and removing from the casing the portion of the line above the joint.

11. The method of cementing oil wells comprising passing a jointed guide line down the well until the lower end thereof reaches the bottom and forcing a body of cement down the well by means of a movable plug, operated by hydraulic pressure, until the plug reaches the joint in the line.

12. The method of cementing oil wells comprising passing a jointed guide line down the well until the lower end thereof reaches the bottom and forcing a body of cement down the well by means of a movable plug, operated by hydraulic pressure, until the plug reaches the joint in the line, disconnecting the line at the joint and removing from the casing the portion of the line above the joint and releasing the hydraulic pressure upon the plug.

Signed at Duncan, Oklahoma, this 1st day of Feb., 1922.

FAIRMAN WALLACE TABER.